United States Patent [19]
Dowedeit

[11] Patent Number: 5,812,846
[45] Date of Patent: Sep. 22, 1998

[54] METHOD AND APPARATUS FOR PASSING CONTROL FROM A FIRST PROCESS TO A SECOND PROCESS

[75] Inventor: Bernd Dowedeit, Holzgerlingen, Germany

[73] Assignee: International Business Machines Corporation, Armonk, N.Y.

[21] Appl. No.: 305,239

[22] Filed: Sep. 13, 1994

[30] Foreign Application Priority Data

Jan. 20, 1994 [EP] European Pat. Off. ............ 94 100 781

[51] Int. Cl.$^6$ .............................. G06F 13/00; G06F 15/00
[52] U.S. Cl. ............................................ 395/680; 395/825
[58] Field of Search .................................... 395/200, 650, 395/500, 672, 673, 675, 800, 862; 364/200

[56] References Cited

U.S. PATENT DOCUMENTS

| | | | |
|---|---|---|---|
| 4,509,119 | 4/1985 | Gumaer | 364/200 |
| 5,253,342 | 10/1993 | Blount | 395/200 |
| 5,291,597 | 3/1994 | Shorter | 395/650 |
| 5,390,314 | 2/1995 | Swanson | 395/500 |

FOREIGN PATENT DOCUMENTS

| | | |
|---|---|---|
| 062633 | 3/1990 | Japan . |
| 217059 | 8/1992 | Japan . |

OTHER PUBLICATIONS

IBM Technical Disclosure Bulletin vol. 32, No. 12, May 1990, Process Control Executive —A New Paradigm For Operating System Design, pp. 414–419.

Enterprise Systems Architecture/390, Principles of Operation, SA22–7201–0.
"Rexx–IBM's command language for OS/2" by Boling Douglas, PC Magazine vol. 12, Iss: 9. Date: May 11, 1993, pp. 325–333.
"Rexx and the OS/2 Workplace Shell" by Eric Giguere Dr. Dobb's Journal. Dec. 1993.
"Programming Paradigms" by Michael Swaine Dr. Dobb's Journal Jan. 1994.
European Search Report, 900694, 94100781.7.
Research Disclosure, No. 293, Sep. 1988, Havant GB, p. 661, "Command Interface For Multiple Applications", RD 29332.
"Unix System V User's Reference Manual" 1987, Prentice Hall, Englewood Cliffs, US, pp. 153–154, p. 229 line 1–11, p. 233 line 1–6, p. 233 line 14–31, p. 235 line 15–37, p. 85 line 3–10.
A.S. Tanebaum "Operating Systems: Design and Implementation" 1987, Prentice Hall, Englewood Cliffs, US, pp. 20–25, pp. 110–122, p. 137 line 27 figs 3–16, p. 308 line 11, p. 311 line 6, p. 458 line 1249, p. 460 line 1313, p. 472 line 1926, p. 478 line 2206, p. 547 line 5650, p. 551 line 5899.

*Primary Examiner*—Kevin A. Kriess
*Assistant Examiner*—Alice Y. Park
*Attorney, Agent, or Firm*—Arthur J. Samodovitz

[57] ABSTRACT

An apparatus and method for implementation in a computing system (5) which allows the transfer of control from one process (10) to another process (40). The input/output supervisor (20) and a newly provided control mechanism (50) are used to switch control. Transfer of data between the two processes is carried out using a data pool (75). This data pool (75) is accessible to both processes (10, 40) through the control mechanism (50).

8 Claims, 4 Drawing Sheets

METHOD AND APPARATUS FOR PASSING CONTROL FROM A FIRST PROCESS TO A SECOND PROCESS

BACKGROUND OF THE INVENTION

1. Field of the Invention

The invention relates to computer processing system for executing commands comprising a first processor running a first process attached to an input/output supervisor, a dispatcher and a second processor running a second process.

2. Description of the Prior Art

The Restructure Extended Executor, called REXX for short, is a programming language developed by IBM which allows program to be written in a clear and structured manner. Its key characteristics include powerful character string manipulation, automatic data typing and high precision arithmetic. Using REXX for automation tasks has the advantages of increased productivity, consistency, simplification and usability over other methods. In addition, since REXX is an SAA language, both REXX programs and knowledge can be ported between systems.

The REXX language is particularly suitable for:

Command Procedures

Application Front Ends

User-defined Macros

Prototyping

Personal Computing

It is a general purpose programming language—like PL/1—and has the usual "structured programming" instruction such as IF, SELECT, DO, WHILE, LEAVE, as well as other useful built-in functions. A language processor (interpreter) runs REXX programs. That is, the program is processed line-by-line and word-by-word, without first being translated to another form (i.e. compiled). The advantage of this to the user is that if the program fails with a syntax error of some kind, the point of failure is clearly indicated. Currently the REXX programming language is available under several operating systems such as the IBM VM operating system, the IBM Operating System/400 (OS/400) and the IBM Operating System/2 (OS/2).

The VM operating system is an interactive operating system which allows many users to use a computer at the same time. It does this by creating, for each user, a closed system—the so-called virtual machine—separate from the other users of the system. Each user can address peripheral apparatus such as printers and disk drives as if they were directly attached to his or her own operating system without worrying about the other users of the system: the VM operating system will resolve potential use conflicts. The user's virtual machine is controlled from a terminal or a workstation suing a command language.

The command languages, which correspond to the components of the VM operating system, are:

The Control Program (CP) which controls the resources of the real machine, that is the physical computer system including peripheral devices.

The Conversational Monitor System (CMS) which is a conversational operating system designed to run under CP and which can simulate many of the function of an operating system and disk operating system so that they can be run in an interactive or conversational environment.

The Interactive Problem Control System which is an interactive, online facility for reporting and diagnosing software failure and for managing problem information and status.

Each of the command languages has a unique "command environment" that must be active in order for a command to be accepted. For CMS users, the two basic command environments are the CP command environment and the CMS command environment.

When running a REXX program, it is assumed that the system under which the program runs includes at least one active command environment which is selected by default on entry to the REXX program. For example, if the REXX program is called from CMS, the default command environment is CMS. If it is called from another command environment, then the default environment may be that other command environment. The default environment may be changed by using the ADDRESS built-in function.

A REXX program not only includes REXX programming instructions supplied by the REXX programming language but may also include commands which are to be processed by the command environment in which the REXX program is running. For example, if the REXX program has CMS as the default environment, then the REXX program can also directly include CMS and CP commands. When the REXX language processor reads a CMS or CP command in the program, control of the system is passed to the environment which processes the command (which may of course have side effects). On completion of the command, control returns to the language processor after setting a return code. The language processor places this return code in a REXX special variable RC.

The virtual machine interface to the CMS command line is driven by the supervisor, that is to say every CMS command input by the user is converted into a supervisor call (SVC) interruption together with associated parameters. Supervisor Call instructions are described in more detail in the Enterprise Systems Architecture/390 Principles of Operation (IBM Publications Number SA22-7201) and are well-known in the prior art. In older versions of CMS, only the SVC 202 interruption was used. In more modern versions both the SVC 202 and SVC 204 interruptions are used. This is described in detail in the IBM manual "VM/SP CMS for System Programming". Similarly, when the REXX language processor encounters a CMS command in a REXX program, it simulates the CMS command line and uses the supervisor call (SVC) interruption.

In an operating system such as VSE/ESA, there are also supervisor calls (SVC) that provides VSE system services. However, A VSE program cannot request execution of a VSE JCL command via a SVC due to VSE JCL design constraints. Thus enabling the REXX language processor to execute VSE Job Control Language (JCL) commands included in a REXX program cannot be done in an analogous manner to the REXX language processor's processing of CMS commands.

Known from the prior art are several other methods for enabling a first process to switch to and control a second process.

U.S. Pat. No. 4,683,549 (Takaki) discloses a sequence control method and apparatus. A sequence program is divided into a plurality of divisional programs of desired processing stages. Once each of the divisional program is started it continues running. When a next divisional program in the sequence is to be run, the currently running divisional program is terminated and the next divisional program started which then continues running until it is stopped. The control of the divisional programs in the sequence is provided by a main program which records the execution status of each of the divisional programs and starts them as required.

An article in the IBM Technical Disclosure Bulletin, vol 32, no 12, May 1990, pp 414–419 entitled "Process Control Executive—a new paradigm for operating system design" discloses a method for constructing operating systems that are required to function efficiently in highly parallel environments. Using the Process Control Executive, all modules that handle a specific request pass work via a packet called a Resource Request (RRQ). The RRQ defines completely a unit of work in the system. It contains and/or points to all the data necessary for its processing. It is created by some initiating resource manager, routed by the PCE to a server resource manager, processed and eventually destroyed as a result of some terminal condition.

SUMMARY OF THE INVENTION

An object of the invention is therefore to produce a method which enables a first process to switch to and control a second process. This object is solved by a data pool connected to the second processor and the first processor for storing data produced by the first processor and the second processor, a data pool manager for managing the data pool, and a control mechanism for passing control between the first processor and second processor, the control mechanism being connected between the second processor and the first processor. Using the control mechanism, one is able to interrupt accesses to the input/output supervisor and using the dispatcher transfer control to the second processor running the second process. This is particularly advantageous since the facilities for doing this are to a large extent already present in the machine, one needs to add only a comparatively few lines of code in order to implement the mechanism.

The data pool ensures an efficient transfer of data produced by one of the processes which is required for use by another one of the processes. The data pool is administered by a manager.

The second processor comprises a kernel for interpreting the commands of a programming language and modules connected to the kernel for adapting the second processor to the environment of the first processor. By dividing the processor into two portions, one is able to reuse the code in a variety of different computer environments and operating systems. The modules provide the necessary adaptation to ensure that the kernel is able to exploit the services of the operating system.

A command, ASSIGN SYSRDR, REXX or ADRESS JCL, is used for switching the execution of commands from the first processor to the second processor and vice versa.

The object is furthermore solved by a method of transferring control in a computer system from a second processing system to a first processing system comprising the following steps: a first step of reading in a command for executing in the first processing system, a second step of passing control of the computer system to a control mechanism, a third step of passing the executable command to an input/output area of the first processing system, a fourth step of switching control of the computer system to the first processing system, a fifth step of executing command in the first processing system, a sixth step of returning control to the second processing system. The fourth and sixth steps of the method involve swapping the program status word (PSW) of the computer system.

The invention furthermore includes a method for initiating in a computer system a second processing system from a first processing system comprising the following steps: a first step of sending an initialization command to an input/output supervisor, a second step of passing control of the computer system to a control mechanism by means of a dispatcher controlled by the input/output supervisor, a third step of passing control of the computer system to the second processing system.

The third step of this method comprises saving the program status word (PSW) of the computer system relating to the operation of the first operating system in a temporary save area, and fetching the program status word (PSW) of the computer system relating to the operating of the second operating system.

In this embodiment, the requests for reading and writing data to the second processing system are passed to a data pool accessible to the second processing system and the first processing system. This ensures an efficient transfer of data between the first and second processing systems.

DESCRIPTION OF THE PREFERRED EMBODIMENT

Overview

Logical Unit

This is a logical input/output (I/O) device which can be assigned to a physical input or output device. In VSE this is carried out by using the command of the form:

ASSGN SYSRDR,00A

In this example the system reader, SYSRDR, which is a logical input/output device is assigned to the physical input/output unit with the system device address 00A.

VSE Job Control Language (JCL) Processor

The VSE JCL Processor is a command processor which can process VSE commands in batch mode. VSE JCL reads an input command by an input/output (I/O) operation from the logical input unit SYSRDR, processes this command and then reads the next command from the logical input unit SYSRDR. The input data for the VSE commands can be read from any one of a number of logical input units, generally denoted by X1, X2, . . . , Xi. The output data can be written to any one of a number of logical output units, generally denoted Y1, Y2, . . . , Yj. In VSE an example of a logical input unit is SYSIN and an example of a logical output unit is SYSLST.

Procedural Language (PL)

A procedural language is a programming language in which the user states a specific set of instructions that the computer must perform in a given sequence. The REXX programming language is an example of a procedural language.

Procedural Language Processor

The procedural language processor is an interpreter which interprets the instruction of a procedural language step by step.

Description of the Computer System

Figure 1:
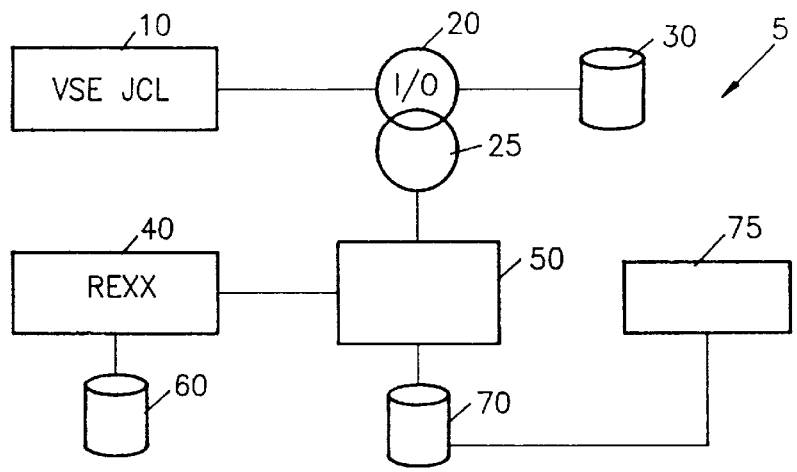
FIG. 1 shows an overview of the invention.

FIG. 1 shows an overview of the invention incorporated into a computer system 5. A VSE JCL processor 10 is connected with an input/output (I/O) supervisor 20 which controls all of the input and output operations to the JCL processor 10. The I/O supervisor 20 is connected to a physical device 30 (such as the aforementioned 00A) on which are stored the programs containing JCL commands. The I/O supervisor 20 is also connected to a control mechanism 50. The role of the control mechanism 50 will be explained in more detail later. The I/O Supervisor 20 is provided with a dispatcher 25 whose functions is to dispatch processes from the I/O supervisor to a part of the computer system 5 on which the process is to be executed.

The control mechanism 50 is connected to a data pool 70. The data pool 70 is controlled by a data pool manager 75 and stores the input and output data required by the programs running on the system wishing to transfer data between the JCL processor 10 and a REXX processor 40. The data pool 70 is addressed through the logical I/O units X1, X2, . . . , Xi and Y1, Y2, . . . , Yj. The logical units can be assigned to a plurality of physical I/O device addresses.

The control mechanism 50 is further connected with the REXX processor 40 which is in turn connected to a physical device 60 on which are stored the programs containing REXX commands.

In order to understand the invention better, it is first of all necessary to understand how the VSE operating system obtains its input data. This is carried out by firstly assigning a specific physical unit, for example the aforementioned unit 00A, to the system reader logical unit SYSRDR by using the JCL command (see above)

ASSGN SYSRDR,00A

In order to execute a command, VSE JCL performs a read request on the system reader SYSRDR which instructs the operating system to read the required data from the system reader SYSRDR. The JCL does not need to know from which physical unit (e.g. 00A) the data comes, it merely issues the command to read the data from the system reader SYSRDR logical unit.

The effect of the read command is to issue a machine language Supervisor Call (SVC) instruction 0 and to start the execution an I/O channel program which describes the detailed execution of the I/O operation. For a detailed description of the I/O channel program reference is made to the above mentioned Enterprise Systems Architecture/390 Principle of Operation.

The effect of the supervisor call instruction is to replace the Program Status Word (PSW) currently being executed in the machine with a new PSW. The current PSW is saved in a temporary store. The I/O supervisor 20 together with a dispatcher 25 interrupts the calling JCL program and the I/O supervisor 20 queues the I/O request on an I/O queue. The I/O supervisor 20 together with the dispatcher 25 then gives control back to the calling JCL program. This is carried out by replacing the PSW for the I/O operation with the original PSW in the temporary store.

The JCL program 10 continues execution until it requires for further execution the input data, i.e. the data that are to be obtained by the previously issued read request. At this point it enters a WAIT state until the data arrives from the I/O supervisor 20 via the dispatcher 25. Asynchronously during the further execution of the JCL program in the JCL processor 10, the VSE operating system processes the I/O requests in the I/O queue, i.e. executes the above mentioned I/O channel programs. The I/O channel program contains the information as to which type of data on what device is to be obtained and the address in storage at which the result of the I/O operation is to be stored.

Once the required input data is read from the physical device 00A, it is passed to the JCL processor 10 which is woken up from the wait state that it entered.

This procedure may be adapted to allow execution of REXX programs in a VSE JCL program as described below. In order to better understand the invention, reference is made to FIG. 2 which shows a data flow diagram of the procedure when in operation and FIG. 3 which shows a control flow diagram of the procedure when in operation. On FIGS. 2 and 3A, the same reference signs are used for the elements common to each figure and to FIG. 1.

When no REXX program is to be executed, the JCL program running in the JCL processor 10 reads the input JCL commands CMDn, CMDn+1, etc. from the physical device 30. The physical device 30 is termed the original device and, for the purposes of this explanation, has been assigned to the physical device address 00A using the command

Figure 3A:
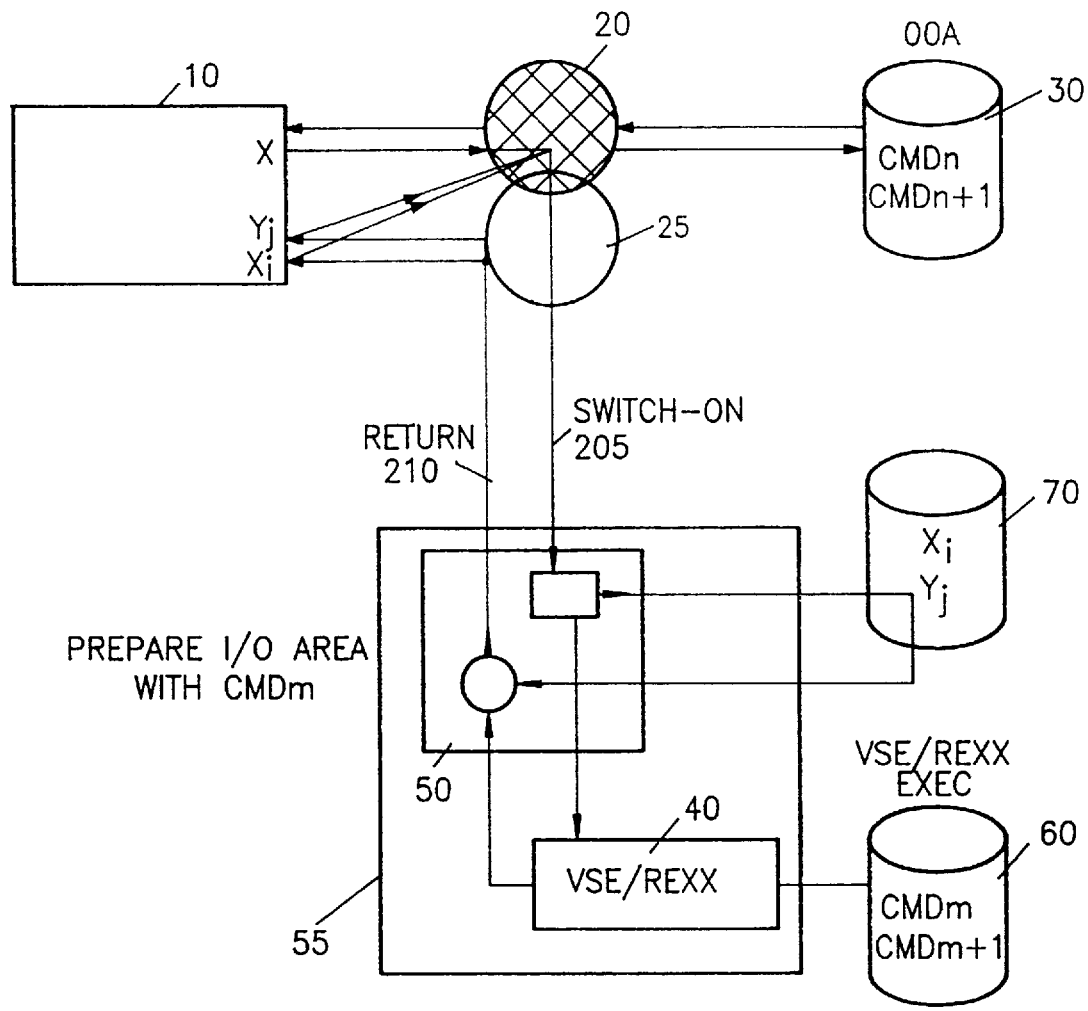
FIG. 3A shows the data flow of the invention.

ASSGN SYSRDR,00A as described above. Data which is to be solely processed by JCL commands is also to be found on the physical device 30 and is input and output using the I/O routines described above. As is shown in FIG. 3A, the commands CMDn from the physical device 30 are passed through the I/O processor 20 to the JCL processor 10.

Figure 2:
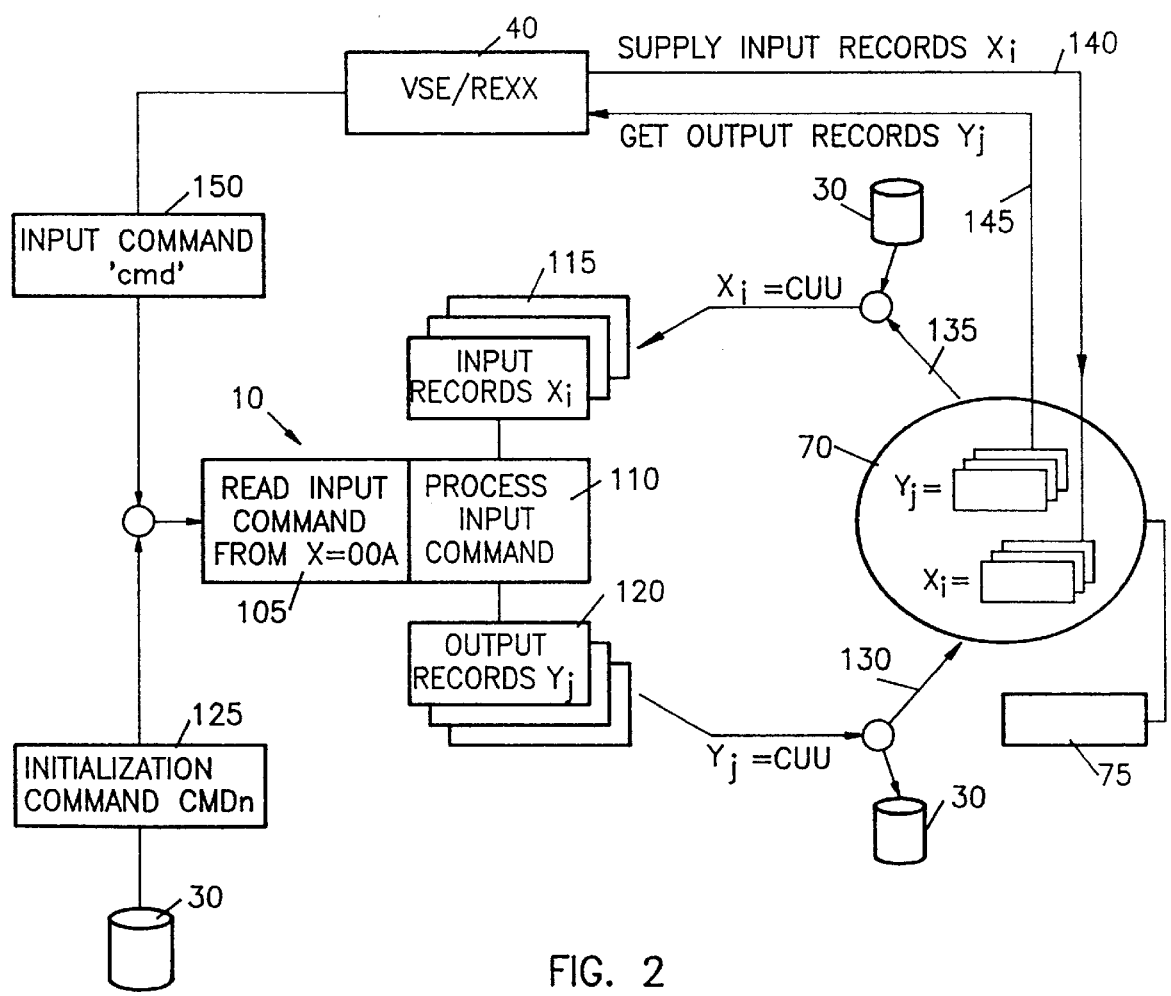
FIG. 2 shows the control flow of the invention.

In FIG. 2, it can be seen that the JCL processor 10 can be divided into two logical parts. A command reader 105 which reads the command via the I/O supervisor 20 and a command processor 110 which processes the command CMDn and reads the data (in the form of input records Xi 115) required for processing the command from the physical device 30. The command processor 110 outputs the data (in the form of output records Yj 120) from the processed command CMDn to the physical device 30. The command reader 105 and the command processor 110 provide I/O areas (not shown) for use by the I/O services.

When a REXX program is to be executed during the processing of a JCL program, the JCL program must first invoke the REXX processor 40. This is carried out by an initialization command 125 that JCL reads from the physical device 30. The initialization commands 125 has the form

ASSGN SYSRDR,REXX

As will be understood from the above discussion concerning the input/output routines, the effect of this command is to assign the JCL input logical unit SYSRDR to a "virtual" REXX dedicated device. The term "virtual" is used to indicate that there is no device attached which performs the processing of the REXX commands. The physical REXX dedicated device is provided by a suitable computer program.

After this command has been processed, the JCL processor 10 makes a further I/O read request in order to read the next command CMDn+1. The I/O supervisor 20 utilizes the resulting I/O interrupt in order to switch to a control mechanism 50 using the dispatcher 25 in the I/O supervisor 20. This is shown by line 205 on FIG. 3A.

The effect of the SVC 0 instruction is now that the I/O supervisor 20 does not queue the I/O request on the I/O queue and does not pass control back to the calling JCL program as described previously. Instead control is passed to a REXX dispatchable unit 55 which is collectively comprised by the control mechanism 50 and the REXX/VSE processor 40. The change of control is carried out by the dispatcher 25 which swaps the currently executing PSW with the appropriate new PSW. In other words, the SVC 0 causes the I/O supervisor 20 along with the dispatcher 25 to pass control of the system to the REXX dispatchable unit 55 instead back to the original JCL dispatchable unit.

Additionally, an I/O channel program (which would normally have been used to queue an I/O request in the I/O queue) is passed to the REXX control mechanism 50.

The control mechanism 50 has to decide whether to pass control of the system to the REXX processor 40 or whether to execute the passed I/O channel program in order to store or to retrieve data from the data pool 70.

When the passed I/O channel program is a read request from system reader logical unit SYSRDR, the control mechanism 50 passes control of the system to the REXX processor 40. The REXX processor 40 reads the further REXX commands from the physical device 60 using I/O requests similar to those known in the prior art. However, if the REXX program has previously assigned the logical units Xi and Yi to the virtual REXX input/output device, read and write requests to the logical units Xi and Yi are switched to the control mechanism 50 as will be described below. The control mechanism 50 then directs them to the data pool manager 75 as illustrated using lines 140 and 145 in FIG. 2.

The control mechanism 50 will ensure that all future read and write requests will not be written directly to the physical device 00A from the command processor 110 but will be passed along lines 130 and 135 to the data pool manager which will store them in the data pool 70.

Figure 3B:
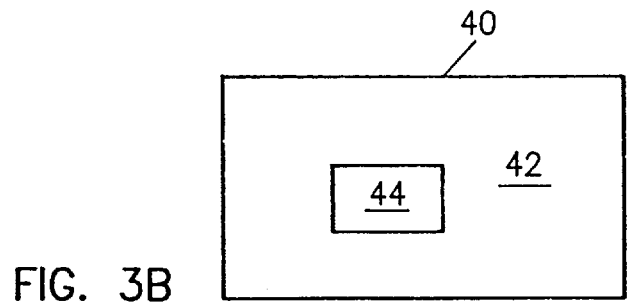
FIG. 3B shows the structure of the REXX/VSE processor.

It should be noted at this point that the REXX processor which is shown as one box on FIG. 3A can in fact be divided into two portions as shown in FIG. 3B. One portion comprises the so-called REXX kernel 44 which is common to all operating systems on which the REXX programming language is provided. It control the basic, operating system independent operation of the REXX programming language. The other portion (i.e. VSE/REXX modules 42) provides those operations, interfaces and commands necessary to adapt the REXX programming language to run under the VSE operating system.

When executing REXX language commands, the REXX kernel 44 processes these as is known in the prior art without reference to the JCL processor 10. The operation of the JCL processor 10 is suspended whilst execution of the REXX commands is being carried out in the REXX processor 40.

Figure 4:
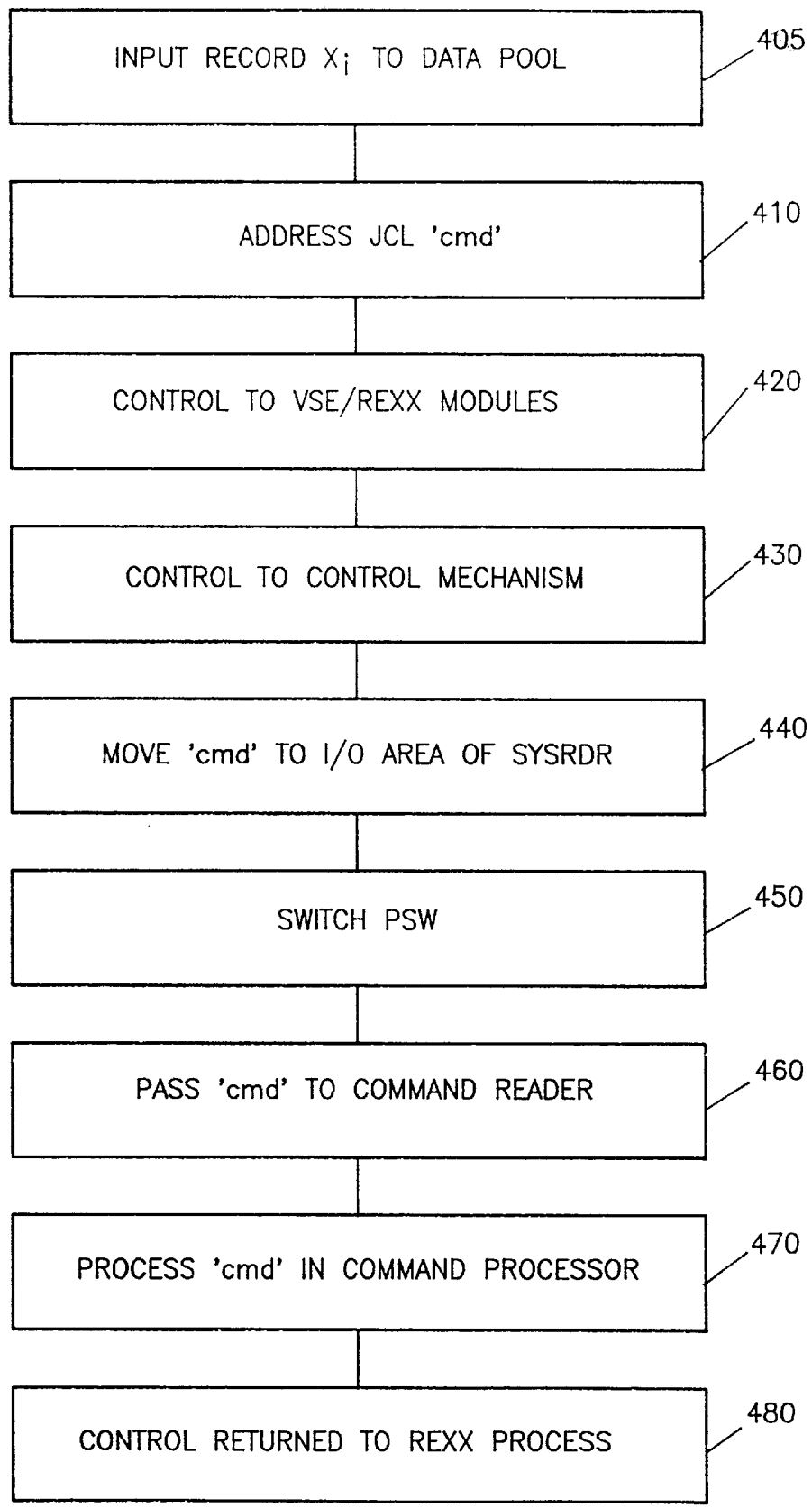
FIG. 4 shows a flow chart for executing an instruction in one processing environment called from another processing environment.

Supposing now that the REXX processor 40 has obtained control of the system and a JCL command CMDm 150 must be executed. A flow diagram showing the execution is given in FIG. 4. Transfer of control is initiated (step 410) by a REXX command of the form ADDRESS JCL 'cmd' where 'cmd' is any JCL command. As explained above, the REXX instruction "ADDRESS" is a standardized interface which indicates to the REXX processor 40 that control is to be passed back to the operating system.

The ADDRESS command is provided by the REXX kernel. On its detection, control (step 420) is passed to the VSE/REXX modules 42 of the REXX processor 40. From the REXX processor 40, control is therefore passed to the control mechanism 50 (step 430). Before the REXX program issues the ADDRESS JCL command, it will write (step 405) the input records Xi 115 required for the execution of the command JCL 'cmd' into the data pool 70. The JCL command 'cmd' 150 is moved from the control program 50 into the I/O area of the read request from logical unit SYSRDR (step 440). The control mechanism 50 switches back to the JCL dispatchable unit along the return path 210 (FIG. 2) using the dispatcher 25. In step 450, the PSW relating to the processing of the REXX instructions is consequently replaced by a PSW relating to the processing of future JCL commands. The command 'cmd' is passed to reader 105 of the VSE JCL processor 10 in step 460 and is processed in the command processor 110 (step 470).

While JCL executes the command 'cmd' 150 output records are written to logical unit Yi and input records are read from logical unit Xi. Supposing the REXX program has previously assigned the logical units Xi and Yi to the virtual REXX input/output device using the instructions ASSIGN Xi,REXX ASSIGN Yi,REXX then read and/or write requests to the logical units Xi and Yi will be handled the same way as described for the logical unit SYSRDR. The control mechanism 50 obtains control and passes the I/O request to the I/O channel program processor that writes Yi 120 and reads Xi 115 data records to the data pool 70 using the data pool manager 75.

After the JCL command 'cmd' has been processed, the JCL processor 10 makes a further read request from SYSRDR in order to read the next input command. At this point, control in step 480 is switched again to the REXX processor 40. This is carried out, as explained above, by swapping the PSWs.

After execution of all the REXX commands in the REXX program, the REXX processor 40 terminates. This causes the control mechanism 50 to reassign SYSRDR to its original device address 00A using an instruction of the form

ASSIGN SYSRDR,00A

The JCL processor 10 will thereafter read input command cmd n+1 from the original physical device 00A.

Figure 5:
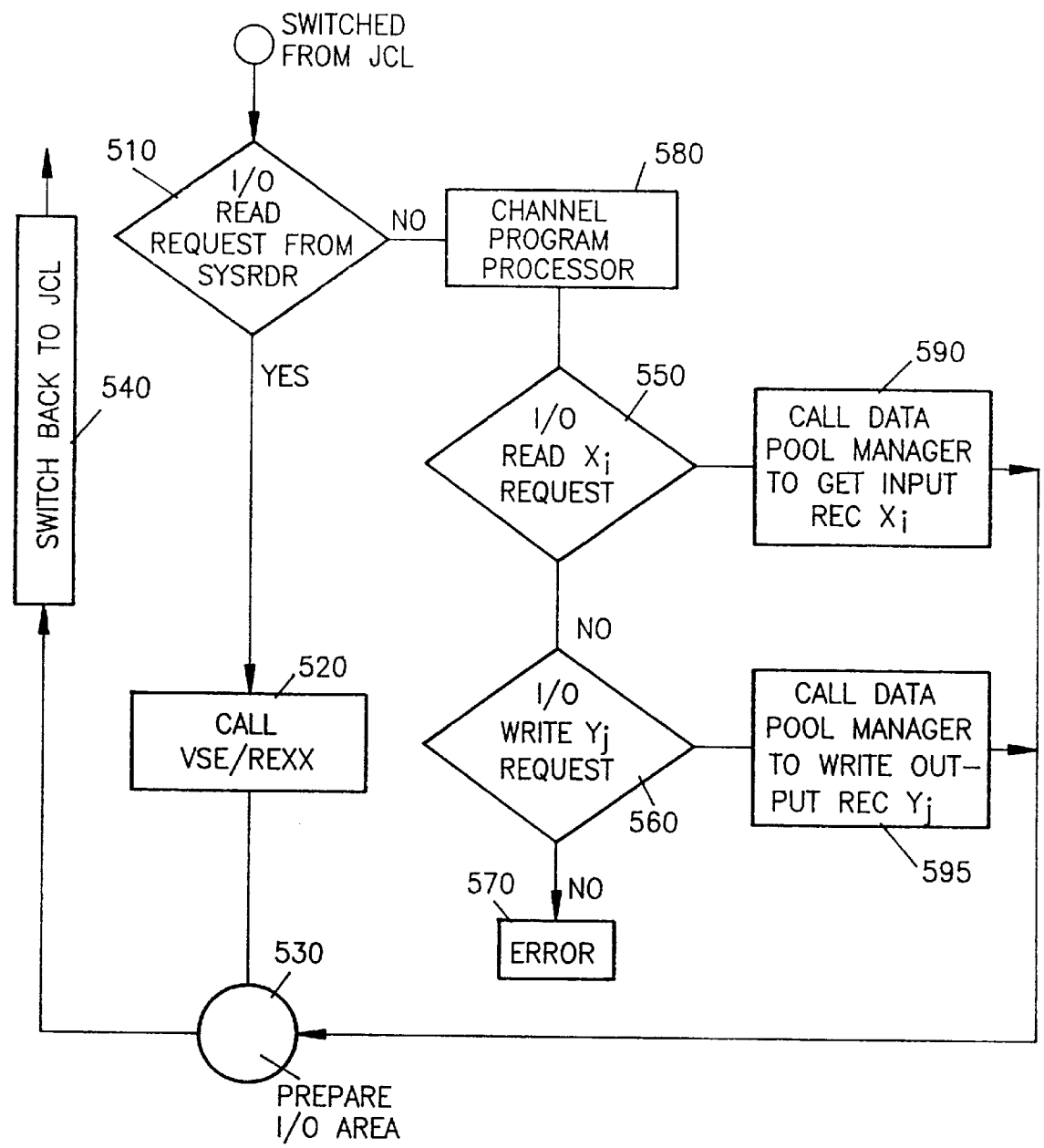
FIG. 5 is a flow diagram showing the operation of the control mechanism of the invention.

FIG. 5 shows a flow diagram for the detailed operation of the control mechanism 50 when switching from a JCL program to a REXX program. The JCL processor 10, step 510 detects whether an I/O read request to the logical unit SYSRDR has been made. This indicates that a REXX program is to be processed and, if this is the case, then the REXX/VSE processor 40 in step 520 is called which executes the REXX program.

If this is not the case, then each I/O request to the logical unit for the input records Xi 115 and to the logical unit for the output records Yj 120 is associated with an I/O channel program that has to be processed by the channel program processor in step 480.

After, as shown in step 480, the I/O channel program is processed, then in steps 450 and 460 a check is made to see whether an I/O read or write request is present. If this is the case, then in step 480, the requests are directed to the data pool manager 75 and in steps 490 and 495 respectively the data is provided from the data pool 70 to the I/O area of the JCL processor 10 or to the data pool 70 from the I/O area of the JCL processor. After completion of this step, control is passed to step 430 where the data I/O area of the JCL processor 10 is prepared for execution or transfer and control passed to the JCL processor 10.

If, however, the I/O channel program passed to the channel program processor 480 detects that neither an I/O read request nor an I/O write request has been requested then an error occurred in functioning of the system and this is signalled in 470.

The details of the invention as described can be used to provide a mechanism to pass control of a machine from one process (such as VSE JCL) to another process (such as REXX).

I claim:

1. A data processing system comprising:

first and second processors providing first and second different command environments, respectively, said first processor executing a first command of a first application, said first application also including second and third commands which are not capable of execution by said first processor;

an I/O processor connected to said first processor to execute a first I/O program corresponding to said first command; and control means, connected between said I/O processor and said second processor to receive from said first processor (a) said second command and a corresponding second I/O program to access data which is accessible by said control means and (b) said third command and a corresponding third I/O program to access other data which is accessible by said second processor but not said control means, for processing said second command and second I/O program and passing control of said third command and said third I/O program to said second processor for processing.

2. A system according to claim 1, wherein the second processor comprises:

a kernel for interpreting commands; and modules connected to the kernel for adapting the second processor to the command environment of said first processor.

3. A system according to claim 1, wherein the first processor comprises:

a command reader for reading in a fourth command from said I/O processor; and a command processor for processing said fourth command.

4. A system according to claim 1, further comprising a dispatcher connected to said I/O processor for passing said second and third commands and said second and third I/O programs from said first processor to said control means.

5. A system as set forth in claim 1 further comprising data pool means, coupled to said control means, for storing I/O data associated with said second command and required for transfer of control of said second command to said control means.

6. A system as set forth in claim 1 wherein said second and third commands and said second and third I/O programs are only sent to said control means if said second processor is invoked.

7. A method for executing an application including first, second and third commands on first and second processors providing first and second different command environments, respectively, said method comprising the steps of:

executing said first command on said first processor, said first processor not being capable of executing said second and third commands;

executing an I/O program associated with said first command on an I/O processor connected to said first processor; and passing said second command and an associated second I/O program and said third command and an associated third I/O program to a control system interposed between said I/O processor and said second processor, said control system executing said second command and said second I/O program without translation to access data which is accessible by said control means and passing said third command and said third I/O program to said second processor, said second processor executing said third command and said third I/O program without translation to access other data which is accessible by said second processor but not said control means.

8. A system as set forth in claim 1 further comprising means for returning control of said application to said first processor after said control means processes said third command and said third I/O program.

* * * * *